United States Patent [19]
Tams et al.

[11] Patent Number: 6,159,320
[45] Date of Patent: Dec. 12, 2000

[54] METHOD AND APPARATUS FOR MANUFACTURING PAINT ROLLERS

[76] Inventors: F. Randy Tams, 3957 Glenview Ter.; Kenneth D. Tams, 3923 Regal Dr., both of Reno, Nev. 89503

[21] Appl. No.: 09/024,971

[22] Filed: Feb. 6, 1998

[51] Int. Cl.⁷ .......................... B29C 47/24; B65H 81/08
[52] U.S. Cl. .................. 156/187; 156/195; 156/244.13; 156/244.17; 156/272.6; 156/429; 29/895.211
[58] Field of Search ...................................... 156/187, 195, 156/244.13, 244.17, 244.18, 244.19, 425, 428, 429, 272.6, 500; 264/209.1, 209.2; 425/381, 382.3; 29/895.211

[56] References Cited

U.S. PATENT DOCUMENTS

| | | |
|---|---|---|
| 2,502,638 | 4/1950 | Becht . |
| 3,301,734 | 1/1967 | Britton et al. . |
| 3,376,180 | 4/1968 | Larson et al. . |
| 3,404,203 | 10/1968 | Donald ................................. 264/209.2 |
| 3,453,163 | 7/1969 | Mills et al. . |
| 3,905,853 | 9/1975 | Stent . |
| 4,191,792 | 3/1980 | Janssen ..................................... 29/120 |
| 4,378,267 | 3/1983 | Saito ....................................... 156/498 |
| 4,395,869 | 8/1983 | Priaroggia ................................ 156/172 |
| 4,692,975 | 9/1987 | Garcia . |
| 5,051,586 | 9/1991 | Sabreen ................................ 156/272.6 |
| 5,108,780 | 4/1992 | Pitt et al. ............................... 156/272.6 |
| 5,137,595 | 8/1992 | Garcia . |
| 5,195,242 | 3/1993 | Sekar . |
| 5,206,968 | 5/1993 | Bower et al. . |
| 5,273,604 | 12/1993 | Garcia . |
| 5,397,414 | 3/1995 | Garcia et al. . |
| 5,398,409 | 3/1995 | Sekar . |
| 5,468,207 | 11/1995 | Bower et al. . |
| 5,537,745 | 7/1996 | Musch et al. . |
| 5,572,790 | 11/1996 | Sekar . |
| 5,614,047 | 3/1997 | Garcia . |
| 5,759,329 | 6/1998 | Krause et al. ........................ 156/272.6 |
| 5,874,032 | 2/1999 | Zdrahala et al. ..................... 264/209.2 |
| 6,019,934 | 2/2000 | Schulte .................................... 264/558 |

FOREIGN PATENT DOCUMENTS 2093060   1/1972   France ................................... 156/195

OTHER PUBLICATIONS

Dyne–A–Mite(TM) Solves Adhesion Problems, Promotional brochure from Enercon Industries Corporation, Menomee Falls, Wisconsin.

Gas Plasma Technology and Its Applications, Stephen L. Kaplan and Robert Holland, Plasma Science, Belment, CA, Mar. 1987.

*Primary Examiner*—Michael W. Ball
*Assistant Examiner*—Barbara J. Musser
*Attorney, Agent, or Firm*—Kolisch, Hartwell, Dickinson, McCormack & Heuser

[57] ABSTRACT

A method of manufacturing paint rollers includes the steps of extruding a cylindrical plastic core through a rotating extruder head, and securing an absorbent sheet material onto an outer surface of the core in a continuous process.

31 Claims, 5 Drawing Sheets

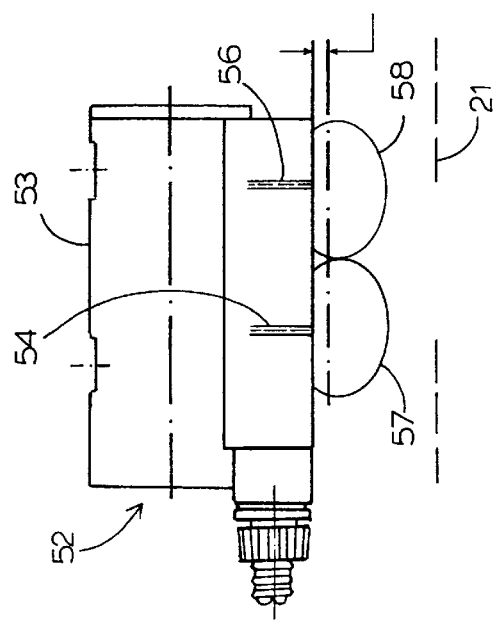
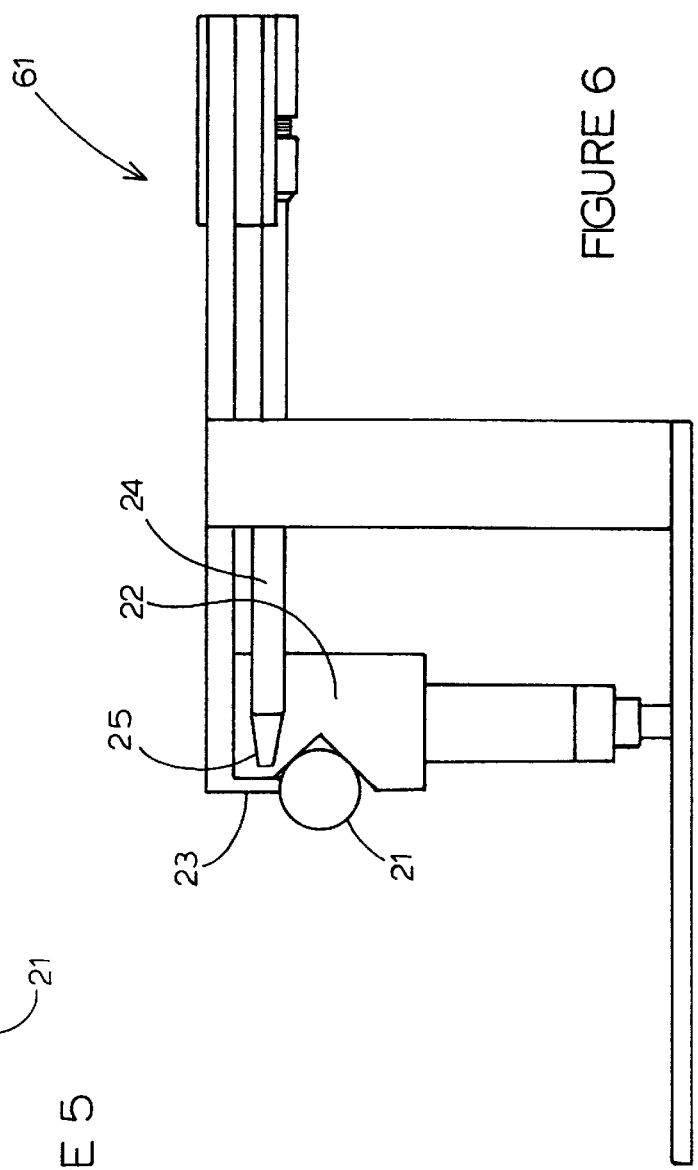

METHOD AND APPARATUS FOR MANUFACTURING PAINT ROLLERS

FIELD OF THE INVENTION

The invention relates to a continuous process for fabricating a paint roller having an extruded plastic core and a hellically-wound absorbent fabric bound to the exterior surface of the core.

BACKGROUND OF THE INVENTION

Paint rollers are and have been commonly used to apply paints and other coating materials to surfaces for many years. Paint rollers have a unique set of required specifications due to the physical nature of the application process and due to the wide range of paints and other coating materials that the roller may be exposed to in routine use. Paint rollers must have a rigid inner core that is manufactured in a cylindrical shape with a high level of precision so that when the paint roller rotates relative to the surface to be painted, it coats evenly. The cylindrical shape of the roller should not yield, bend or deform under significant stress even when the outer fabric has absorbed paint over an extended period. Even slight deformation of the roller shape may cause uneven paint application.

A manufacturer of paint rollers must assume that the roller could be exposed to any of a wide range of fluid compositions. Some paints are water-based and others are oil or solvent-based. Many different pigments, solubilizing agents, surfactants, viscosifiers, emulsifiers, etc., are used in paints, stains and other surface coating compositions. Ideally, the roller core should be inert or at least resistant to all such ingredients so that its rigid cylindrical shape is maintained even after long periods of use, washing and reuse. A sturdy solvent-resistant core yields a longer effective life-time for the roller which is an important objective for those who buy and use paint rollers.

Paint rollers typically have an absorbent fabric material fixed to the external surface of the core. The fabric should be uniformly absorbent and bonded to the core in a manner which remains in tact when the roller is exposed to paint. The fabric must also be applied and bonded to the core in a precise and continuous configuration so that there is no overlap or gaps in the fabric which could result in a non-uniform paint application pattern.

Various procedures have been used by others to produce paint rollers that satisfy to some extent the specifications discussed above. However, a significant disadvantage with prior manufacturing processes is that they require multiple on and off-line procedures. For example, a desirable core material due to its water and solvent resistivity is extruded plastic such as polyethylene or polypropylene. Typically the core material is extruded, formed and cooled in one process, then put through at least a second process where the core is wrapped with fabric. Multiple on and off-line processing sequences add to manufacturing costs and manual work requirements. Thus, there is a need for a paint roller manufacturing method in which a high quality, solvent-resistant paint roller can be fabricated in a single continuous on-line process.

SUMMARY OF THE INVENTION

The invention provides a method, system and apparatus for manufacturing paint rollers through the use of an extruder employing a rotating head so that a plastic core can be extruded and rotated simultaneously while other process steps including application of an outer absorbent material are performed downstream in a single continuous process. The result is a reduction in manufacturing cost compared to prior methods, and a high quality paint roller product, in particular, a solid rigid core that is highly durable and resistant to water and solvents.

In a preferred embodiment of the invention, a cylindrical polypropylene core is extruded. The rotating core then translates through a vacuum sizing and cooling chamber. Next, the core passes through a winding and pulling station which is coordinated with the drive unit of the extruder. The core is subsequently plasma-treated prior to extruding an epoxy adhesive layer on the external surface of the core. Finally, the core is heated, wrapped with fabric and cut into discrete paint rollers. All of the steps are performed in a continuous time- and location-coordinated procedure with minimal if any manual involvement.

BRIEF DESCRIPTION OF THE FIGURES

FIG. 5 is a side view of a plasma discharge unit used in the present invention.

FIG. 6 is a side view of an extrusion assembly used to apply epoxy in a preferred process embodiment of the present invention.

DETAILED DESCRIPTION OF THE INVENTION

The invention provides a system and process for producing paint rollers in a continuous process including extrusion of a highly solvent resistant core and bonding of an absorbent fabric material downstream. The continuous processing feature of the invention allows significant reduction in manufacturing costs and improvement in overall efficiency and product quality compared to prior processes.

Figure 1:
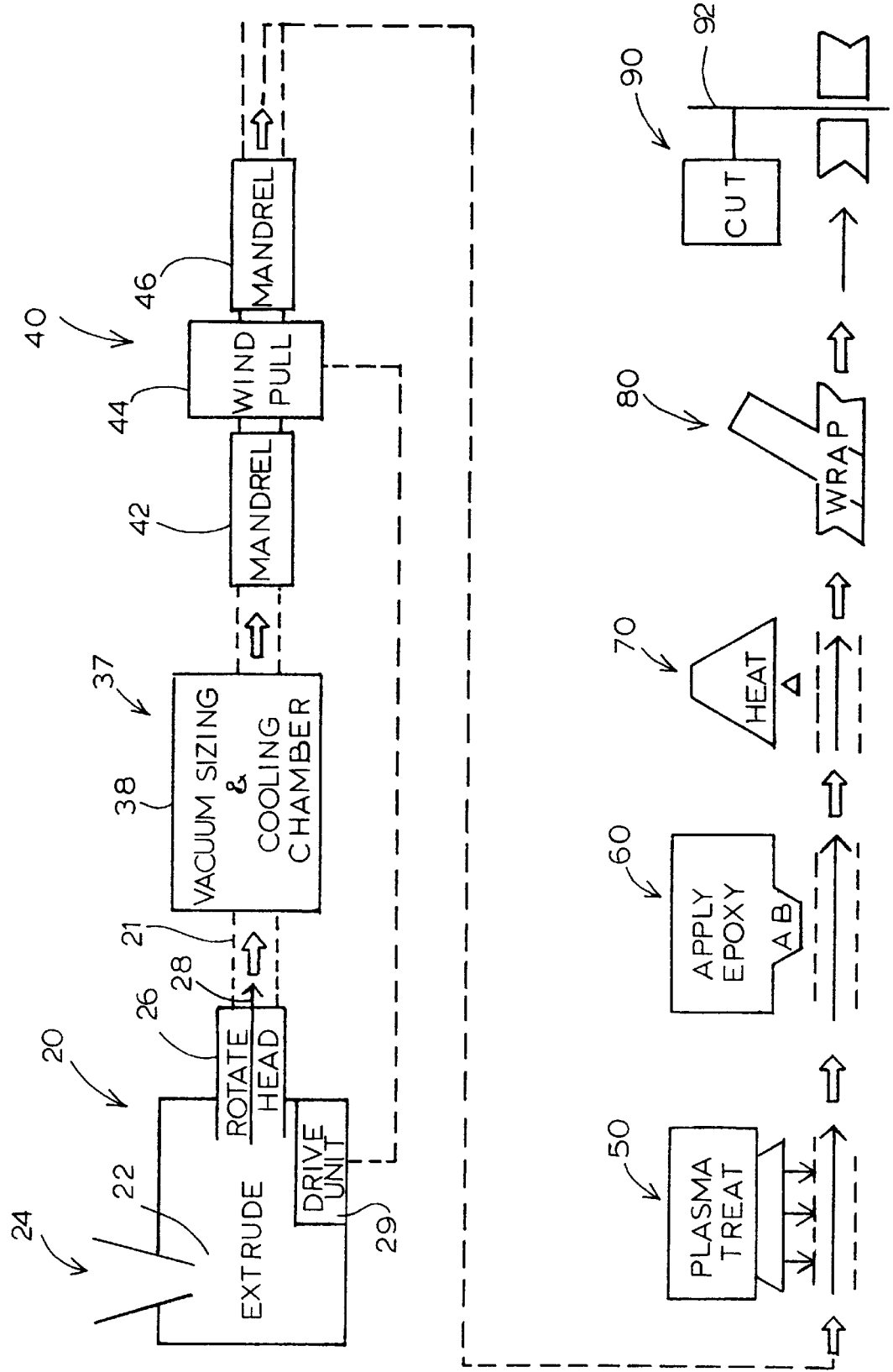
FIG. 1 is a schematic flow chart illustrating a paint roller fabrication method in accordance with a preferred embodiment of the invention.

FIG. 1 is a schematic diagram illustrating process steps in a preferred embodiment of the invention. The first step 20 involves extrusion of a plastic cylindrical pipe or core 21. Extruder 22 receives plastic resin, preferably polypropylene, through hopper 24. The plastic resin melts and is extruded through rotating head 26 into a hollow cylindrical form, core 21, that rotates around axis 28, while translating forward at a constant velocity, under control of drive unit 29. The size of extruder 22 is based on the plastic resin used and the desired output in pounds per hour of plastic core 21. In a preferred embodiment of the invention, a 3½ inch 24:1 L/D air-cooled Meritt Extruder from Meritt Davis Corporation, as shown in FIG. 2, is used along with a rotating extruder head, as shown in FIG. 3, from Guill Tool & Engineering Company of Rhode Island.

Figure 2:
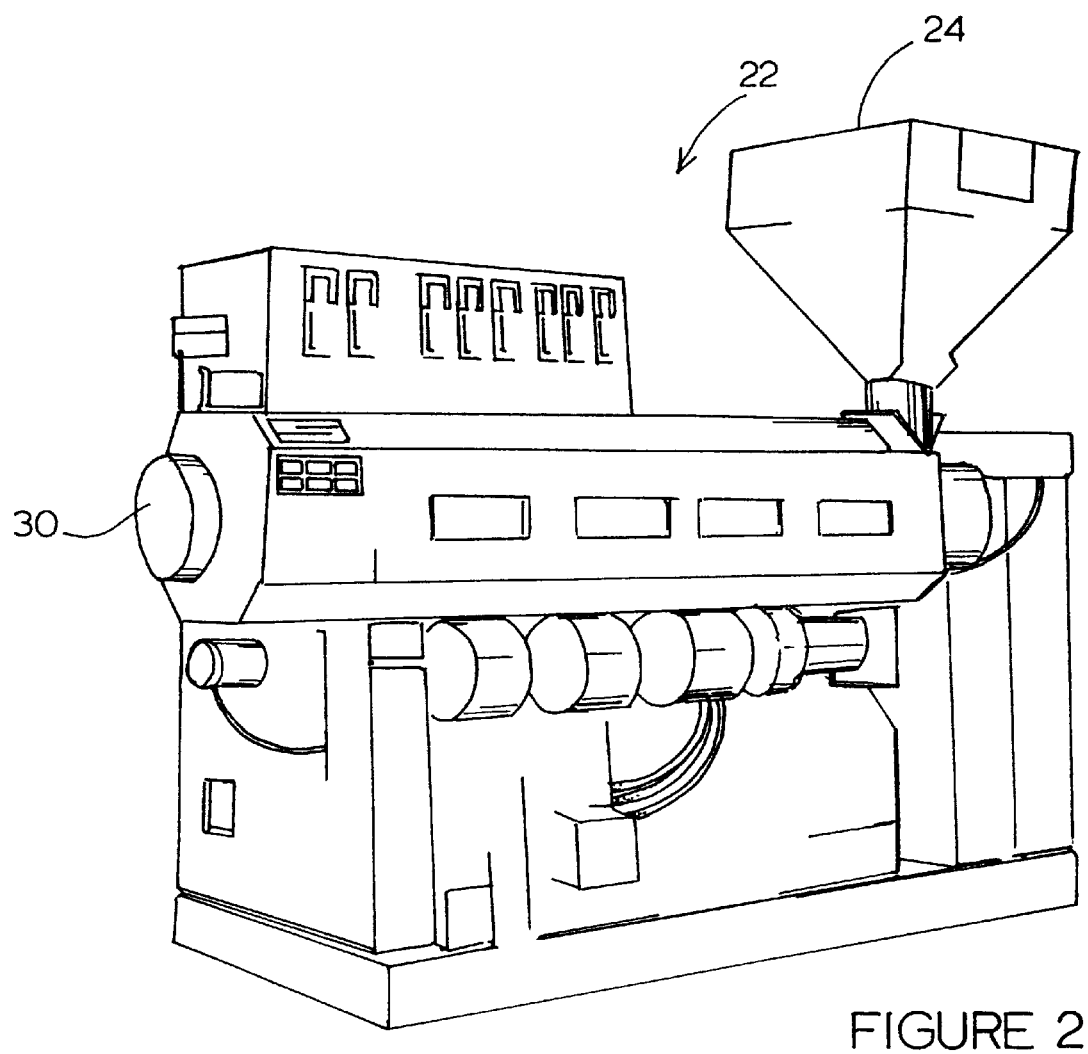
FIG. 2 is a perspective view of an extruder employed in the present invention to produce a cylindrical core for a paint roller.
Figure 3:
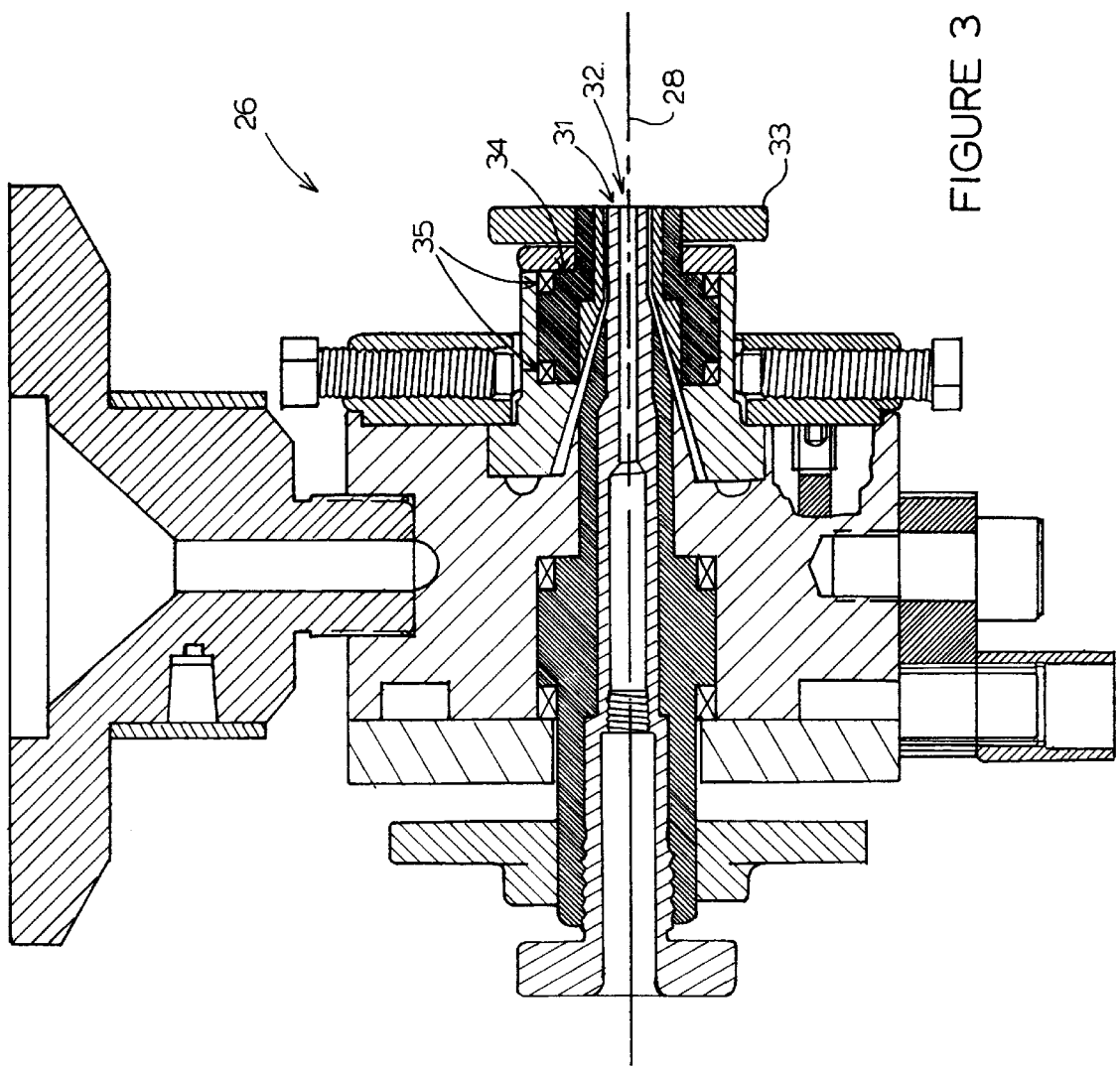
FIG. 3 is a sectional view of the output end of an extruder employing a rotatable head in accordance with a preferred embodiment of the present invention.

Further details of extruder 22 and head 26 are illustrated in FIGS. 2 and 3. FIG. 2 shows extruder 22 including hopper 24 at one end for receiving raw materials such as polypropylene pellets or particles for subsequent melting and extrusion through rotating head 26, as shown in FIG. 3, which is attached to output end 30 of extruder 22. FIG. 3 is a drawing of rotating head assembly 26 including die 31 that defines the outer diameter of extruded core 21, and tip 32 that defines the inner diameter of extruded core 21. The gap between die 31 and tip 32 defines the thickness of core 21. Sprocket or gear 33 facilitates rotation of die 31 and tip 32 around rotational axis 28. Seals 34 prevent melted material from reaching bearings 35 that are used to permit smooth rotational movement of die 31 and tip 32 relative to the outer housing. In the present invention, die 31 and tip 32 rotate at approximately between 100–140 rpms.

Rotating head 26 is powered by SCR drive motors in drive unit 29 to drive both die 31 and tip 32 of head 26 to allow for the extrusion to be rotated in an exact relationship to the forward movement of the extruding core. Controls are used to maintain a plus/minus ratio of 0.01-percent between extruder 22 and head 26. This allows for maximum control of the helical angle at which the core rotates in relation to the forward motion of the core to assure a uniform seam at the fabric application station downstream. Preferably, core 21 moves 3.375 inches of lineal forward movement per 360 degrees of rotation of the core. This is required to accommodate the 2.875 inch slit width fabric used to cover the core downstream. The motors that control the rotation of head 26 are adjustable for fine tuning to assure proper butting of the seam in the fabric application step of the process.

In the second step 37 of the process shown in FIG. 1, plastic core 21 enters a vacuum sizing and cooling tank 38 where a vacuum is applied to the exterior of core 21 along with chilled water spray that cools core 21 down to a "Freeze Point" of about 225° F. This is the point at which full stability is achieved in the plastic. The dimensions are set with a tolerance of +/–0.005 inch to the outside and inside diameters. Typically the inside diameter of the paint roller is 1.485 inches. The wall thickness is 0.045 inch with larger walls as required by the professional market.

Figure 4:
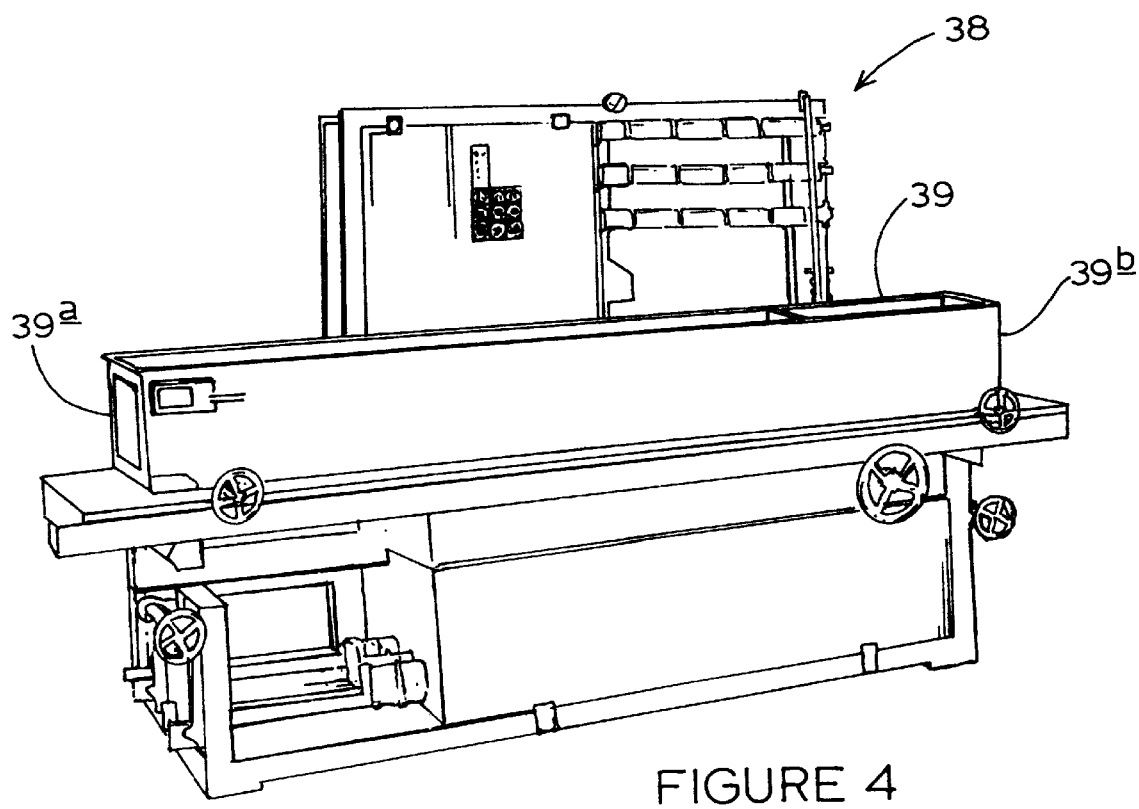
FIG. 4 is a perspective view of a vacuum sizing and cooling chamber used in the present invention.

FIG. 4 shows a perspective view of vacuum sizing and cooling tank 38. Vacuum sizing and cooling tank 38 can be procured from Extrusion Services, Inc. of Akron, Ohio. Tank 38 employs a stainless steel tunnel or chamber 39 through which the core translates after extrusion. Polypropylene core 21 is approximately 500° F. when it exits head 26 of extruder 22. By the time the core reaches entry end 39a of chamber 39, core 21 has cooled to approximately 400–450° F. Water jets or spray inside chamber 39 continue to cool core 21 so that by the time it exits output end 39b of chamber 39, core 21 is approximately 200–225° F.

In the third step 40, as illustrated in FIG. 1, core 21, after traveling approximately 2–3 feet from output end 39b of chamber 39, enters guide 42 made of a hollow steel mandrel that has an inside diameter of 0.010 inches larger than the outside diameter of plastic core 21. The length of guide 42 is about 30 inches. The end of guide 42 is located within approximately 2 inches from the leading edge of winding belt 44. Belt 44 is configured to pull and continue rotation of plastic core 21. Winding belt 44 is controlled by drive unit 29 of extruder 22 so that winding belt 44 precisely maintains the rotation rate and translational velocity of core 21 to match the rate at which core 21 is exiting and rotating from extruder 22. After core 21 exits winding belt 44, it enters a second hollow steel guide 46 of the same diameters as first guide 42. This allows core 21 to be properly aligned and positioned for the next step. Coordination of the rotational drive functions of extruder head 26 and winding belt 44 on opposite sides of cooling chamber 38 is an important feature of the invention because it allows core 21 to be rotated, in sync with fabric wrapping downstream, without deformation of the core's cylindrical shape even when core 21 is somewhat fluid as it exits extruder 22.

In the fourth step 50 of the process illustrated in FIG. 1, the external surface of core 21 is treated with high voltage electrical plasma in order to attract and accommodate adhesive applied in the next step of the process. In a preferred embodiment a surface treater obtained from Intercon Industries Corporation of Wisconsin is used. The surface treater employs a corona discharge head including two electrodes that generate an air blown electrical arc to form a treatment plasma. The corona discharge electrodes are positioned approximately ¼ inch away from the external surface of rotating core 21. The plasma treatment increases the surface energy and tension on the outer surface of plastic core 21 which allows easier application and improved adhesion of epoxy in the next step. As shown in FIG. 5, surface treater 52 employs corona discharge head 53 which includes electrodes 54 and 56. Electrode 54 generates a plasma treatment area 57 that is elliptical in shape on the external surface of core 21 as it rotates and translates past surface treater 52. Similarly, electrode 56 generates a plasma treatment pattern 58 on the external surface of core 21 adjacent plasma treatment pattern 57. Other numbers of heads, electrodes and combinations of treatment patterns can be used. The important thing is that, given the rates of forward movement and rotation of core 21, the overall treatment should totally cover the external surface of core 21.

Between plasma treatment step 50 and the next step 60, as shown in FIG. 1, core 21 should have at least about 3–4 seconds to react before application of epoxy in step 60. A thin layer of epoxy is applied to the surface in step 60. This is accomplished by use of gear pumps for both the "a" and "b" resins, driven by an SCR-type motor which extrudes a thin film of epoxy onto the surface of plastic core 21. Adhesive resins which work well for this application are sold under the trademarks MASTER 5200A and 5200B, and MASTER GRIP 5200A and 5300B, which are available from Fielco Industries of Huntingdon Valley, Pa.

FIG. 6 illustrates an epoxy extrusion unit for dispensing a thin layer of epoxy resin, parts A and B, on the external surface of core 21. A cross-section of core 21 is seen in FIG. 6 with its axis of rotation perpendicular to the page. Core 21 is held against V-block 22, in part, by the fabric wrapping unit downstream. A doctor blade or knife bar 23 is positioned near the external surface of core 21 for the purpose of metering the thickness of the adhesive layer being applied to core 21. The thickness of the extruder adhesive layer is preferably approximately 3–5 thousandths of an inch. Subparts of the adhesive are combined and mixed in dispenser 24 prior to dispensing the adhesive through tip 25 near the edge of doctor blade 23.

Once the film is applied, it is heated to 300° F. by use of a parabolic infrared heater in step 70. This allows the epoxy film to rapidly set so the continuous core can be cut in a short amount of time.

Fabric is introduced in step 80 at the proper helical angle to match the angle of core rotation originally established by extruder 22 and rotating head 26 at the beginning of the process, and as perpetuated by winding belt 44 in the third step 40 of the process. The fabric is guided onto the core by use of a fabric stand and tensioning device. The tension on the fabric is preferably about 5–7 pounds to assure that the fabric is embedded into the epoxy film. Core 21 travels approximately 30 feet after fabric winding step 80 to accommodate completion of epoxy curing.

Finally, in step 90 fabric-covered core 21 enters traveling cut-off saw 92 which is programmed to cut the core into pre-selected lengths. The cut cores are discharged onto an accumulation table. The core lengths are then ready to be processed into finished lengths and packaged.

We claim:

1. A method of manufacturing paint rollers comprising
   extruding a rotating hollow cylindrical plastic core through a rotating extruder head,
   plasma treating the outer surface of the core,
   applying epoxy resin to the outer surface of the core by extruding thin films of first and second epoxy resin subcomponents, and
   securing an absorbent sheet material onto an outer surface of the core after the applying step.

2. A method of manufacturing paint rollers comprising
   extruding a cylindrical plastic core through a rotating extruder head,
   plasma treating an outer surface of the core, wherein the plasma treating step includes the step of applying corona discharge to the outer surface of the core,
   applying epoxy resin including thin films of first and second epoxy resin subcomponents, to the outer surface of the core, and
   securing an absorbent sheet material onto the outer surface of the core.

3. The method of claim 2 further comprising the step of heating the films with a parabolic infrared heater prior to the securing step.

4. The method of claim 3 further comprising the step of winding fabric onto the epoxy resin on the outer surface of the core after the heating step.

5. A method of manufacturing paint rollers comprising
   extruding a rotating hollow cylindrical plastic core through a rotating extruder head,
   winding and pulling the core, wherein the winding and pulling steps are performed by a winding belt,
   moving the core through a first hollow guide mandrel upstream from the winding belt and moving the core through a second hollow guide mandrel downstream from the winding belt, and
   securing an absorbent sheet material onto an outer surface of the core.

6. The method of claim 1 further comprising the step of heating the films with a parabolic infrared heater prior to the securing step.

7. An apparatus for producing paint rollers comprising
   an extruder including a rotatable head configured to extrude a rotating hollow cylindrical plastic core,
   an extruder drive unit for driving rotation of the head,
   a plasma treatment station downstream from the extruder,
   a fabric application mechanism located downstream from the extruder,
   an epoxy resin extruder for applying thin films of resin onto an outer surface of the core upstream from the fabric application mechanism, and
   a parabolic infrared heater located downstream from the epoxy resin extruder for heating films of epoxy resin prior to applying fabric.

8. The method of claim 1, wherein the steps of extruding, plasma treating, applying, and securing are performed in a single continuous process.

9. The method of claim 1 further comprising the step of winding and pulling the core.

10. The method of claim 1 further comprising the step of cooling the core between the extruding step and the securing step.

11. The method of claim 10, wherein the cooling step includes the step of spraying water on the core.

12. The method of claim 10, wherein the cooling step proceeds until the core has a temperature of less than about 225° F.

13. The method of claim 1 further comprising the step of vacuum sizing the core after it exits the extrusion head before the core cools to a freeze point.

14. The method of claim 13, wherein the vacuum sizing step includes the step of moving the core into a vacuum sizing chamber and applying a vacuum to the outer surface of the core.

15. The method of claim 1 further comprising the steps of
   vacuum sizing the core and simultaneously cooling the core in a vacuum sizing and cooling chamber between the extruding step and the securing step.

16. The method of claim 1 further comprising the steps of
   moving the core through a first hollow guide mandrel upstream from the winding belt and moving the core through a second hollow guide mandrel downstream from the winding belt.

17. The method of claim 1 further comprising the step of
   cutting the core into sections according to desired paint roller dimensions after the securing step.

18. The method of claim 2, wherein the steps of extruding, plasma treating, applying, and securing are performed in a single continuous process.

19. The method of claim 2 further comprising the step of
   cooling the core between the extruding step and the securing step.

20. The method of claim 19, wherein the cooling step includes the step of spraying water on the core.

21. The method of claim 19, wherein the cooling step proceeds until the core has a temperature of less than about 225° F.

22. The method of claim 2 further comprising the step of vacuum sizing the core after it exits the extrusion head before the core cools to a freeze point.

23. The method of claim 22, wherein the vacuum sizing step includes the step of moving the core into a vacuum sizing chamber and applying a vacuum to the outer surface of the core.

24. The method of claim 2 further comprising the steps of
   vacuum sizing the core and simultaneously cooling the core in a vacuum sizing and cooling chamber between the extruding step and the securing step.

25. The method of claim 2 further comprising the step of
   cutting the core into sections according to desired paint roller dimensions after the securing step.

26. The method of claim 5, wherein the steps of extruding, winding, pulling, moving, and securing are all performed in a single continuous process.

27. The method of claim 5 further comprising the step of plasma treating the outer surface of the core.

28. The method of claim 5 further comprising the step of
   applying epoxy resin to the outer surface of the core by extruding tin films of first and second epoxy resin subcomponents.

29. The method of claim 5 further comprising the step of
   cutting the core into sections according to desired paint roller dimensions after the securing step.

30. The method of claim 5 further comprising the step of
   moving the core into a vacuum sizing chamber and applying a vacuum to the outer surface of the core.

31. The method of claim 5 further comprising the steps of
   vacuum sizing the core and simultaneously cooling the core in a vacuum sizing and cooling chamber between the extruding step and the securing step.

* * * * *